United States Patent
Wei et al.

(10) Patent No.: US 12,160,271 B2
(45) Date of Patent: Dec. 3, 2024

(54) OPTICAL COMMUNICATION DEVICE, OPTICAL COMMUNICATION SYSTEM, AND METHOD FOR ESTABLISHING COMMUNICATION CONNECTION

(71) Applicants: Beijing BOE Technology Development Co., Ltd., Beijing (CN); BOE Technology Group Co., Ltd., Beijing (CN)

(72) Inventors: Xiangye Wei, Beijing (CN); Liming Xiu, Beijing (CN); Yiming Bai, Beijing (CN); Xin Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/767,763

(22) PCT Filed: Mar. 9, 2021

(86) PCT No.: PCT/CN2021/079753
§ 371 (c)(1),
(2) Date: Apr. 8, 2022

(87) PCT Pub. No.: WO2021/213039
PCT Pub. Date: Oct. 28, 2021

(65) Prior Publication Data
US 2024/0089003 A1    Mar. 14, 2024

(30) Foreign Application Priority Data

Apr. 23, 2020  (CN) .......................... 202010325557.8

(51) Int. Cl.
*H04B 10/50*    (2013.01)

(52) U.S. Cl.
CPC .................................. *H04B 10/502* (2013.01)

(58) Field of Classification Search
None
See application file for complete search history.

(56) References Cited

U.S. PATENT DOCUMENTS

2015/0016610 A1    1/2015    Verma et al.
2016/0099774 A1    4/2016    Sim et al.
(Continued)

FOREIGN PATENT DOCUMENTS

CN    103021052 A    4/2013
CN    103178906 A    6/2013
(Continued)

OTHER PUBLICATIONS

CN202010325557.8 first office action.
(Continued)

*Primary Examiner* — David W Lambert
(74) *Attorney, Agent, or Firm* — IPro, PLLC

(57) ABSTRACT

An optical communication device, an optical communication system, and a method for establishing a communication connection are provided, relating to communications technology. In the optical communication device, the first driving circuit can control, based on the generated first target plaintext, the optical signal transmitting circuit to transmit the first optical signal, and control, based on the generated first key, the optical signal transmitting circuit to transmit the second optical signal. That is, an optical communication device that detects the optical signals can establish, based on the optical signals, a communication connection with the optical communication device that transmits the optical signals.

17 Claims, 7 Drawing Sheets

(56) References Cited

U.S. PATENT DOCUMENTS

| | | |
|---|---|---|
| 2018/0054423 A1 | 2/2018 | Liu et al. |
| 2018/0198607 A1 | 7/2018 | Punekar et al. |
| 2018/0367524 A1 | 12/2018 | Ji et al. |
| 2020/0036518 A1* | 1/2020 | Oda .............. G06F 7/582 |
| 2021/0232175 A1 | 7/2021 | Li et al. |

FOREIGN PATENT DOCUMENTS

| | | | |
|---|---|---|---|
| CN | 104980228 A | | 10/2015 |
| CN | 105139194 A | | 12/2015 |
| CN | 105450419 A | * | 3/2016 |
| CN | 105491034 A | | 4/2016 |
| CN | 105763255 A | | 7/2016 |
| CN | 106209895 A | | 12/2016 |
| CN | 106603485 A | | 4/2017 |
| CN | 106792126 A | | 5/2017 |
| CN | 106792700 A | | 5/2017 |
| CN | 107358441 A | | 11/2017 |
| CN | 109040060 A | | 12/2018 |
| CN | 109617687 A | | 4/2019 |
| CN | 110168966 A | | 8/2019 |
| CN | 110492935 A | | 11/2019 |
| CN | 110492936 A | | 11/2019 |
| CN | 110752913 A | | 2/2020 |
| CN | 110891263 A | | 3/2020 |
| CN | 111510214 A | | 8/2020 |
| EP | 3820076 A1 | | 5/2021 |
| JP | 2000232407 A | | 8/2000 |
| WO | 2020050950 A1 | | 3/2020 |

OTHER PUBLICATIONS

CN202010325557.8 second office action.
CN202010325557.8 Notification to grant patent right for invention.

* cited by examiner

OPTICAL COMMUNICATION DEVICE, OPTICAL COMMUNICATION SYSTEM, AND METHOD FOR ESTABLISHING COMMUNICATION CONNECTION

CROSS-REFERENCE TO RELATED APPLICATION

The present application is a 371 of PCT Patent Application Serial No. PCT/CN2021/079753, filed on Mar. 9, 2021, which claims priority to Chinese Patent Application No. 202010325557.8, filed on Apr. 23, 2020, and entitled "OPTICAL COMMUNICATION DEVICE, OPTICAL COMMUNICATION SYSTEM, AND COMMUNICATIONAL CONNECTION ESTABLISHING METHOD", the entire contents of both of which are incorporated herein by reference.

TECHNICAL FIELD

The present disclosure relates to the technical of communications technology, and in particular, to an optical communication device, an optical communication system, and a method for establishing a communication connection.

BACKGROUND

With the rapid development of communications technology, a series of recognition technologies that bring great convenience and security to human beings are gradually applied in various fields.

For example, in the field of payment, the emerging face recognition technology is gradually used to replace the traditional QR code payment; in the field of anti-theft, the emerging fingerprint recognition technology is gradually used to replace the traditional key unlocking; in the field of transportation, a series of card (such as subway card) recognition technologies also come into being.

However, in near filed communication (NFC), the recognition end and the recognized end need to be close to each other to establish a communication connection and complete the recognition, which is inflexible.

SUMMARY

Embodiments of the present disclosure provide an optical communication device, an optical communication system, and a method for establishing a communication connection. The technical solutions are as follows.

According to an aspect, an optical communication device is provided, including: a first driving circuit, and an optical signal transmitting circuit connected to the first driving circuit, wherein
  the first driving circuit is configured to generate a first target plaintext, and output a first driving signal to the optical signal transmitting circuit based on the first target plaintext; and,
  generate a first key based on the first target plaintext, and output a second driving signal to the optical signal transmitting circuit based on the first key; and
  the optical signal transmitting circuit is configured to transmit a first optical signal in response to the first driving signal, and transmit a second optical signal in response to the second driving signal.

Optionally, the first driving circuit includes: a first control sub-circuit and a first control signal generating sub-circuit;
  the first control sub-circuit is respectively connected to the optical signal transmitting circuit and the first control signal generating sub-circuit, the first control sub-circuit is configured to generate the first target plaintext, generate a first control word set based on the first target plaintext, and send the first control word set to the first control signal generating sub-circuit, the first control word set comprising a plurality of different first control words;
  the first control signal generating sub-circuit is configured to generate a first control signal set based on the first control word set, and send the first control signal set to the first control sub-circuit, the first control signal set including a plurality of different first control signals having different frequencies; and
  the first control sub-circuit is further configured to generate the first key based on the first control signal set, output the second driving signal to the optical signal transmitting circuit based on the first key, and output the first driving signal to the optical signal transmitting circuit based on the first target plaintext.

Optionally, the first target plaintext includes: a first random seed.

Optionally, the first control signal generating sub-circuit includes: a candidate signals generating module and a control signal generating module;
  the candidate signals generating module is connected to the control signal generating module, and the candidate signals generating module has a plurality of output terminals; the candidate signals generating module is configured to generate a plurality of candidate signals having the same frequency and different phases, and output the plurality of candidate signals to the control signal generating module through the plurality of output terminals in a one-to-one correspondence, wherein a quantity of the candidate signals is the same as a quantity of the output terminals, and the candidate signals output by any two adjacent output terminals have the same phase difference; and
  the control signal generating module is further connected to the first control sub-circuit; the control signal generating module is configured to generate the first control signal set based on the plurality of candidate signals and the first control word set sent by the first control sub-circuit, and send the first control signal set to the first control sub-circuit.

Optionally, the first driving circuit is further configured to generate a first target identifier which uniquely identifies the optical communication device, and send the initial driving signal to the optical signal transmitting circuit based on the first target identifier; and
  the optical signal transmitting circuit is further configured to transmit a third optical signal in response to the initial driving signal.

According to another aspect, an optical communication device is provided, including: an optical signal receiving circuit, and a second driving circuit connected to the optical signal receiving circuit;
  the optical signal receiving circuit is configured to receive a fourth optical signal and a fifth optical signal, convert the fourth optical signal into a first electrical signal, convert the fifth optical signal into a second electrical signal, and send the first electrical signal and the second electrical signal to the second driving circuit; and
  the second driving circuit is configured to obtain a second target plaintext based on the first electrical signal, obtain a second key based on the second electrical signal, generate a third key based on the second target plaintext, and verify whether the third key matches the second key.

Optionally, the second driving circuit includes: a second control sub-circuit and a second control signal generating sub-circuit;

the second control sub-circuit is respectively connected to the optical signal receiving circuit and the second control signal generating sub-circuit, the second control sub-circuit is configured to obtain the second target plaintext based on the first electrical signal, obtain the second key based on the second electrical signal, generate a second control word set based on the second target plaintext, and send the second control word set to the second control signal generating sub-circuit, the second control word set including a plurality of different second control words;

the second control signal generating sub-circuit is configured to generate a second control signal set based on the second control word set, and send the second control signal set to the second control sub-circuit, the second control signal set including a plurality of second control signals having different frequencies; and the second control sub-circuit is further configured to generate the third key based on the second control signal set, and verify whether the third key matches the second key.

Optionally, the second target plaintext includes: a second random seed.

Optionally, the optical signal receiving circuit is further configured to receive a sixth optical signal, convert the sixth optical signal into a third electrical signal, and send the third electrical signal to the second driving circuit; and the second driving circuit is further configured to obtain a second target identifier based on the third electrical signal, search for a stored identifier which is the same as the second target identifier, and if the stored identifier which is the same as the second target identifier is found, perform an operation of obtaining the second target plaintext and the second key.

According to further another aspect, a method for establishing a communication connection is provided, applied to the optical communication device described in the foregoing aspect, the method including:

generating a first target plaintext;

transmitting a first optical signal based on the first target plaintext;

generating a first key based on the first target plaintext; and transmitting a second optical signal based on the first key.

According to still another aspect, a method for establishing a communication connection is provided, applied to the optical communication device described in the foregoing aspect, the method including:

obtaining a second target plaintext based on a received fourth optical signal;

generating a third key based on the second target plaintext;

obtaining a second key based on a received fifth optical signal; and verifying whether the third key matches the second key.

According to still another aspect, an optical communication system is provided, including: an optical signal transmitting terminal and an optical signal receiving terminal, wherein the optical signal transmitting terminal includes the optical communication device described in one aspect above, and the optical signal receiving terminal includes the optical communication device described in another aspect above;

the fourth optical signal received by the optical signal receiving terminal and the first optical signal transmitted by the optical signal transmitting terminal are the same optical signal; the second target plaintext obtained by the optical signal receiving terminal is the same as the first target plaintext generated by the optical signal transmitting terminal; the fifth optical signal received by the optical signal receiving terminal and the second optical signal transmitted by the optical signal transmitting terminal are the same optical signal; and the second key obtained by the optical signal receiving terminal is the same as the first key generated by the optical signal transmitting terminal; and the optical signal receiving terminal is configured to establish a communication connection with the optical signal transmitting terminal upon verifying that the generated third key is the same as the obtained second key.

Optionally, the sixth optical signal received by the optical signal receiving terminal and the third optical signal transmitted by the optical signal transmitting terminal are the same optical signal; and the second target identifier obtained by the optical signal receiving terminal is the same as the first target identifier generated by the optical signal transmitting terminal.

Optionally, the optical signal receiving terminal further includes the optical communication device described in one aspect above, and/or the optical signal receiving terminal further includes the optical communication device described in another aspect above.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely, some embodiments of the present application, and those of ordinary skill in the art may still derive other drawings from these accompanying drawings without creative efforts.

DETAILED DESCRIPTION

In order to make the objectives, technical solutions and advantages of the present disclosure clearer, implementations of the present disclosure will be further described in detail below in combination with the accompanying drawings.

Figure 1:
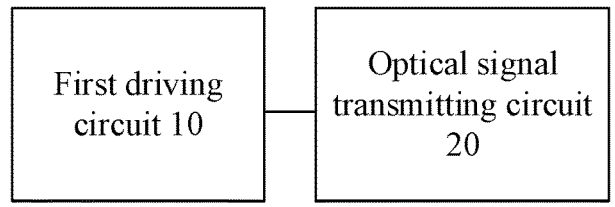
FIG. 1 is a schematic structural diagram of an optical communication device according to an embodiment of the present disclosure.

FIG. 1 is a schematic structural diagram of an optical communication device according to an embodiment of the present disclosure. As shown in FIG. 1, the optical communication device may include: a first driving circuit 10, and an optical signal transmitting circuit 20 connected to the first driving circuit 10.

The first driving circuit 10 may be configured to generate a first target plaintext, and output a first driving signal to the optical signal transmitting circuit 20 based on the first target plaintext. The first driving circuit 10 may be further configured to generate a first key based on the first target plaintext, and output a second driving signal to the optical signal transmitting circuit 20 based on the first key.

The optical signal transmitting circuit 20 may transmit a first optical signal in response to the first driving signal, and transmit a second optical signal in response to the second driving signal.

For example, the optical signal transmitting circuit 20 may transmit the first optical signal according to a first frequency when the first driving circuit 10 outputs the first driving signal to the optical signal transmitting circuit 20; the optical signal transmitting circuit 20 may transmit the second optical signal according to a second frequency when the first driving circuit 10 outputs the second driving signal to the optical signal transmitting circuit 20. That is, the optical signal transmitting circuit 20 can transmit optical signals according to different frequencies, so as to indicate different parameters (including the first target plaintext and the first key).

Optionally, the optical signal transmitting circuit 20 may include: a light emitting diode (LED). The first frequency may be a default frequency stored by the optical communication device, for example, a pre-configured frequency at factory, or a frequency set by a developer during initial startup of the optical communication device. Moreover, the first frequency may be a frequency agreed upon in advance by the optical communication device and an optical communication device that detects the optical signal. The second frequency may be a constantly changing frequency, that is, the second frequency may be a variable frequency. The key is sent by using a variable frequency, to ensure the security of key transmission.

The first optical signal and the second optical signal can be used for instructing the optical communication device that detects the optical signals to obtain the first target plaintext and the first key, generate a key based on the first target plaintext, and if it is verified that the obtained first key matches the generated key, establish a communication connection with the optical communication device that transmits the optical signals. In addition, because the first driving circuit 10 controls, based on the first target plaintext, the optical signal transmitting circuit 20 to transmit the first optical signal, the first optical signal can be used for instructing the optical communication device that detects the optical signal to obtain the first target plaintext. Because the first driving circuit 10 controls, based on the first key, the optical signal transmitting circuit 20 to transmit the second optical signal, the second optical signal can be used for instructing the optical communication device that detects the optical signal to obtain the first key. In the embodiments of the present disclosure, the optical communication device that transmits the optical signals may be referred to as a first optical communication device, and the optical communication device that receives the optical signals may be referred to as a second optical communication device.

Optionally, two key matching each other can mean that the two keys satisfy a predetermined condition/relationship, or the two keys are the same. Of course, in order to ensure the security of establishment of the communication connection, keys matching each other in the embodiments of the present disclosure can mean that the keys are the same.

In conclusion, the embodiments of the present disclosure provide an optical communication device. In the optical communication device, the first driving circuit can control, based on the generated first target plaintext, the optical signal transmitting circuit to transmit the first optical signal, and control, based on the generated first key, the optical signal transmitting circuit to transmit the second optical signal. That is, an optical communication device that detects the optical signals can establish, based on the optical signals, a communication connection with the optical communication device that transmits the optical signals. Since optical signals have a relatively long transmitting distance and a relatively large range, the flexibility of establishment of the communication connection is improved while the reliability of establishment of the communication connection is ensured.

Figure 2:
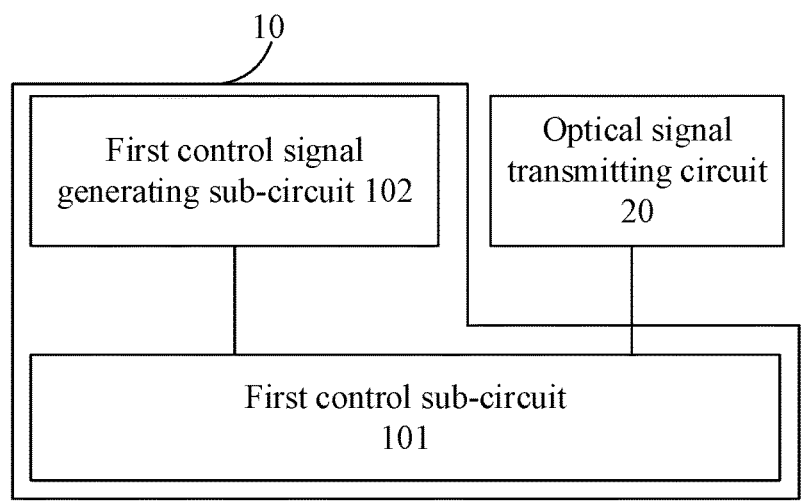
FIG. 2 is a schematic structural diagram of another optical communication device according to an embodiment of the present disclosure.

Optionally, the optical signals in the embodiments of the present disclosure are all visible optical signals. Accordingly, the optical communication devices in the embodiments of the present disclosure may be referred to as visible optical communication devices. FIG. 2 is a schematic structural diagram of another optical communication device according to an embodiment of the present disclosure. As shown in FIG. 2, the first driving circuit 10 may include: a first control sub-circuit 101 and a first control signal generating sub-circuit 102.

The first control sub-circuit 101 may be connected to the optical signal transmitting circuit 20 and the first control signal generating sub-circuit 102. The first control sub-circuit 101 may be configured to generate a first target plaintext, generate a first control word set based on the first target plaintext, and send the first control word set to the first control signal generating sub-circuit 102. The first control word set may include a plurality of different first control words.

Optionally, the first control sub-circuit 101 may be a micro controller unit (MCU). The first target plaintext may include: a first random seed. The random seed may be any random number generated based on a software program, and the first random seed may be a binary number.

Accordingly, in order to generate the first random seed and generate the first control word set based on the first random seed, the first control sub-circuit 101 may include a random number generator and a pseudo-random binary sequence (PRBS) generator. The first control sub-circuit 101 may generate the first random seed by using the random number generator as the first target plaintext, and may generate the first control word set based on the first random seed by using the PRBS generator, wherein the first control word set can also be referred to as a first control word sequence.

The first target plaintext may be referred to as a real random number, and the plurality of first control words in the first control word set may be referred to as pseudo-random numbers. In normal operation, the PRBS generator may use the first target plaintext (i.e., the real random number) as an initial value, i.e., use the first target plaintext as an initial condition, and generate a plurality of pseudo-random numbers based on a pseudo-random number generation algorithm pre-configured therein, where the plurality of pseudo-random numbers is the plurality of first control words in the embodiments of the present disclosure.

The first control signal generating sub-circuit 102 may be configured to generate a first control signal set based on the first control word set, and send the first control signal set to the first control sub-circuit 101. The first control signal set may include a plurality of first control signals having different frequencies.

Optionally, the first control sub-circuit 101 may sequentially send the first control words in the first control word set to the first control signal generating sub-circuit 102 according to a sequence of generating the first control words. Accordingly, the first control signal generating sub-circuit 102 may sequentially generate a plurality of first control signals based on the sequentially received first control words, and then sequentially send the plurality of first control signals to the first control sub-circuit 101.

In addition, since the first control signal generating sub-circuit 102 needs to operate in response to control words, in order to ensure that the first control signal generating sub-circuit 102 enters an operating state, the first control sub-circuit 101 may first output a reference control word to the first control signal generating sub-circuit 102 to control the first control signal generating sub-circuit 102 to enter the operating state.

The first control sub-circuit 101 may be further configured to generate a first key based on the first control signal set, output a second driving signal to the optical signal transmitting circuit 20 based on the first key, and output a first driving signal to the optical signal transmitting circuit 20 based on the first target plaintext.

Optionally, a key encoding rule may be pre-configured in the first control sub-circuit 101. After obtaining the first control signal set, the first control sub-circuit 101 may generate the first key based on the frequencies of the first control signals in the first control signal set and the key encoding rule. For example, it is assumed that the key encoding rule is that, if the frequency of the first control signal is greater than a frequency threshold, an assigned value is 1; if the frequency of the first control signal is less than the frequency threshold, an assigned value is 0. In this case, the first key generated by the first control sub-circuit 101 may be a string consisting of multiple binary values.

It should be noted that, a key encoding rule may also be pre-configured in the optical communication device that detects the optical signals, i.e., the second optical communication device, and the pre-configured key encoding rule may be the same as the key encoding rule in the first control sub-circuit 101. Further, after obtaining the first target plaintext generated by the optical communication device that transmits the optical signals (i.e., the first optical communication device), the second optical communication device further generates a key based on the first target plaintext and the key encoding rule, and establish a communication connection with the first optical communication device based on the generated key and the key received from the first optical communication device.

Optionally, during normal operation, the first control sub-circuit 101 may first control, based on the generated first target plaintext, the optical signal transmitting circuit 20 to transmit the first optical signal. After the first optical signal is transmitted, the first control sub-circuit 101 may generate the first key and control, based on the first key, the optical signal transmitting circuit 20 to transmit the second optical signal. That is, the optical communication device may first send the first target plaintext, and then send the first key.

The optical communication device that detects the optical signals generates the key based on the first random seed generated in real time by the optical communication device that transmits the optical signals, instead of generating the key based on pre-stored fixed information. Therefore, the generated key has high timeliness, randomness, complexity and security, which further ensures the security and reliability of the communication connection established between the two optical communication devices. Moreover, because the first control signals in the first control signal set sent by the first control signal generating sub-circuit 102 to the first control sub-circuit 101 have different frequencies, the first control signal generating sub-circuit 102 controls the optical signal transmitting circuit 20 to transmit optical signals with a variable frequency, that is, the first key is sent in a variable frequency state, which makes it more difficult to crack the key, thereby further improving the security of establishing the communication connection.

Figure 3:
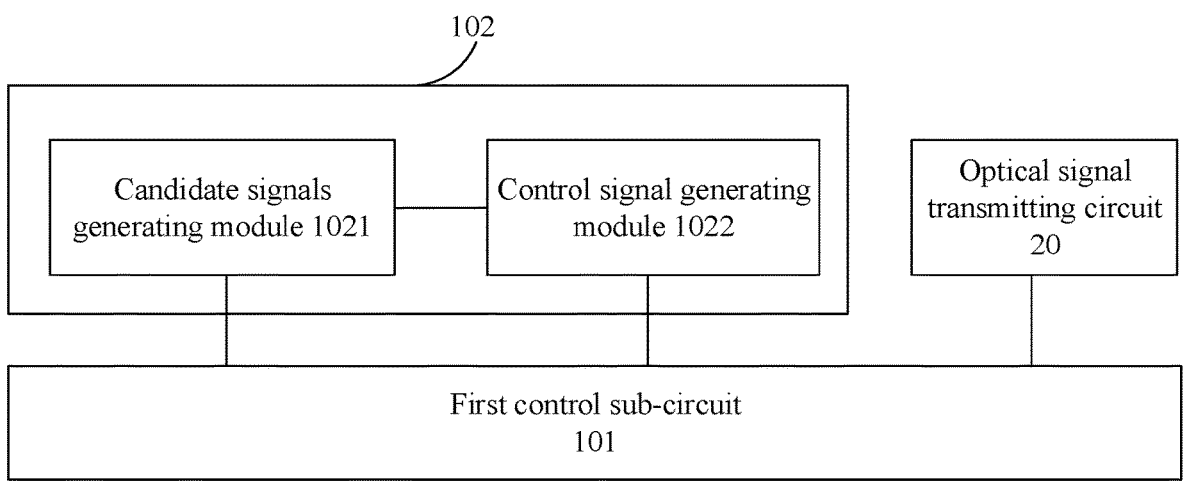
FIG. 3 is a schematic structural diagram of further another optical communication device according to an embodiment of the present disclosure.

FIG. 3 is a schematic structural diagram of another first optical communication device according to an embodiment of the present disclosure. As shown in FIG. 3, the first control signal generating sub-circuit 102 may include: a candidate signals generating module 1021 and a control signal generating module 1022.

The candidate signals generating module 1021 may be connected to the control signal generating module 1022, and the candidate signals generating module 1021 may have a plurality of output terminals. The candidate signals generating module 1021 may be configured to generate a plurality of candidate signals having the same frequency and different phases, and output the plurality of candidate signals to the control signal generating module 1022 through the plurality of output terminals in a one-to-one correspondence. The number of the candidate signals is the same as that of the output terminals, and the candidate signals output by any two adjacent output terminals have the same phase difference.

Figure 4:
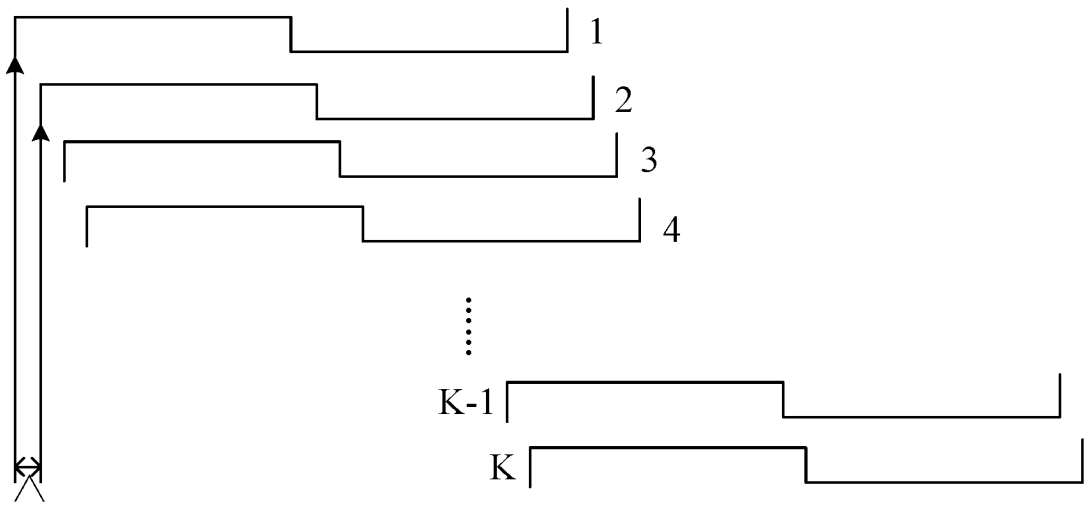
FIG. 4 is a schematic diagram of a plurality of candidate signals according to an embodiment of the present disclosure.

For example, the candidate signals generating module 1021 generates a total of K candidate signals, and FIG. 4 shows a schematic diagram of the candidate signals. In addition, a phase difference A between every two adjacent candidate signals satisfies the following formula:

$$\Delta = 1/K*f1'  \quad \text{formula (1);}$$

wherein K is the number of the candidate signals, and f1' is the frequency of the candidate signals. Accordingly, the candidate signals generating module 1021 may also be referred to as a K-inputs circuit.

Optionally, the number K of candidate signals that can be generated by the candidate signals generating module 1021 may be pre-configured in the candidate signals generating module 1021, e.g., configured in the module by a user (such as a developer) during production of the candidate signals generating module 1021. In addition, K may be 2 to the i-th power, and i may be an integer greater than or equal to 1. For example, K may be 16, 32, 128 or the like.

The control signal generating module 1022 may also be connected to the first control sub-circuit 101. The control signal generating module 1022 may be configured to generate a first control signal set including a plurality of different first control signals based on the plurality of candidate signals and the first control word set sent by the first control sub-circuit 101, and send the first control signal set to the first control sub-circuit 101.

Figure 5:
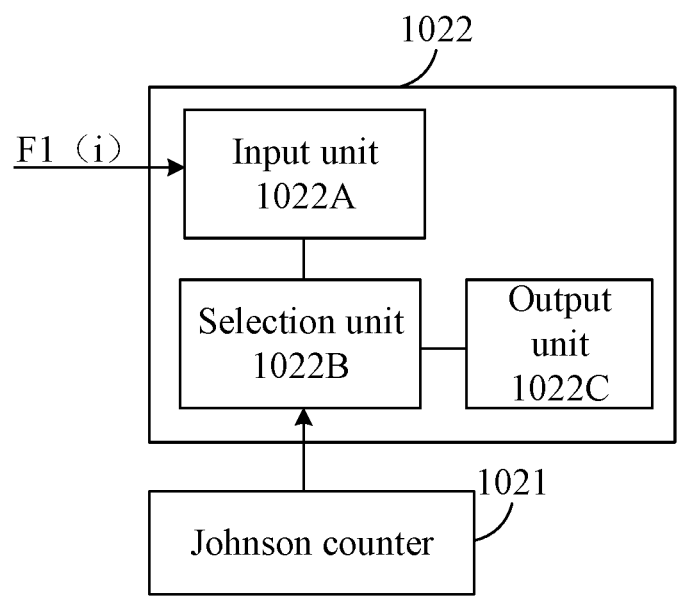
FIG. 5 is a schematic structural diagram of a first control signal generating sub-circuit according to an embodiment of the present disclosure.

Optionally, among the plurality of first control signals generated by the control signal generating module 1022, the i-th first control signal f1(i) may satisfy the following formula:

$$f1(i) = K*f1'/F1(i) \quad \text{formula (2);}$$

wherein F1(i) is the i-th first control word among the plurality of different first control words in the first control word set, and i is a positive integer that is not greater than the number of the first control words in the first control word set. For example, assuming that the first control word set includes a total of I first control words and I is an integer greater than 1, values of i and I can satisfy the following relationship:

FIG. 5 is a schematic structural diagram of a first control signal generating sub-circuit according to an embodiment of the present disclosure. As shown in FIG. 5, the candidate signals generating module 1021 may include a Johnson counter. The control signal generating module 1022 may include: an input unit 1022A, a selection unit 1022B, and an output unit 1022C.

The input unit 1022A may be connected to the first control sub-circuit 101 (not shown in FIG. 5), and the input unit 1022A may be configured to output a selection control signal to the selection unit 1022B based on the first control word. Besides, the input unit 1022A may operate in response to only one first control word each time. Because the first control words in the first control word set are different from each other, the input unit 1022A may output a different selection control signal each time.

The selection unit 1022B may further be connected to the candidate signals generating module 1021 and the output unit 1022C. The selection unit 1022B may be configured to select a target candidate signal from the plurality of candidate signals in response to the selection control signal, and output the target candidate signal to the output unit 1022C.

The output unit 1022C may be configured to generate, based on the target candidate signal, a first control signal set including a plurality of first control signals having different frequencies, and send the first control signal set to the first control sub-circuit 101.

Figure 6:
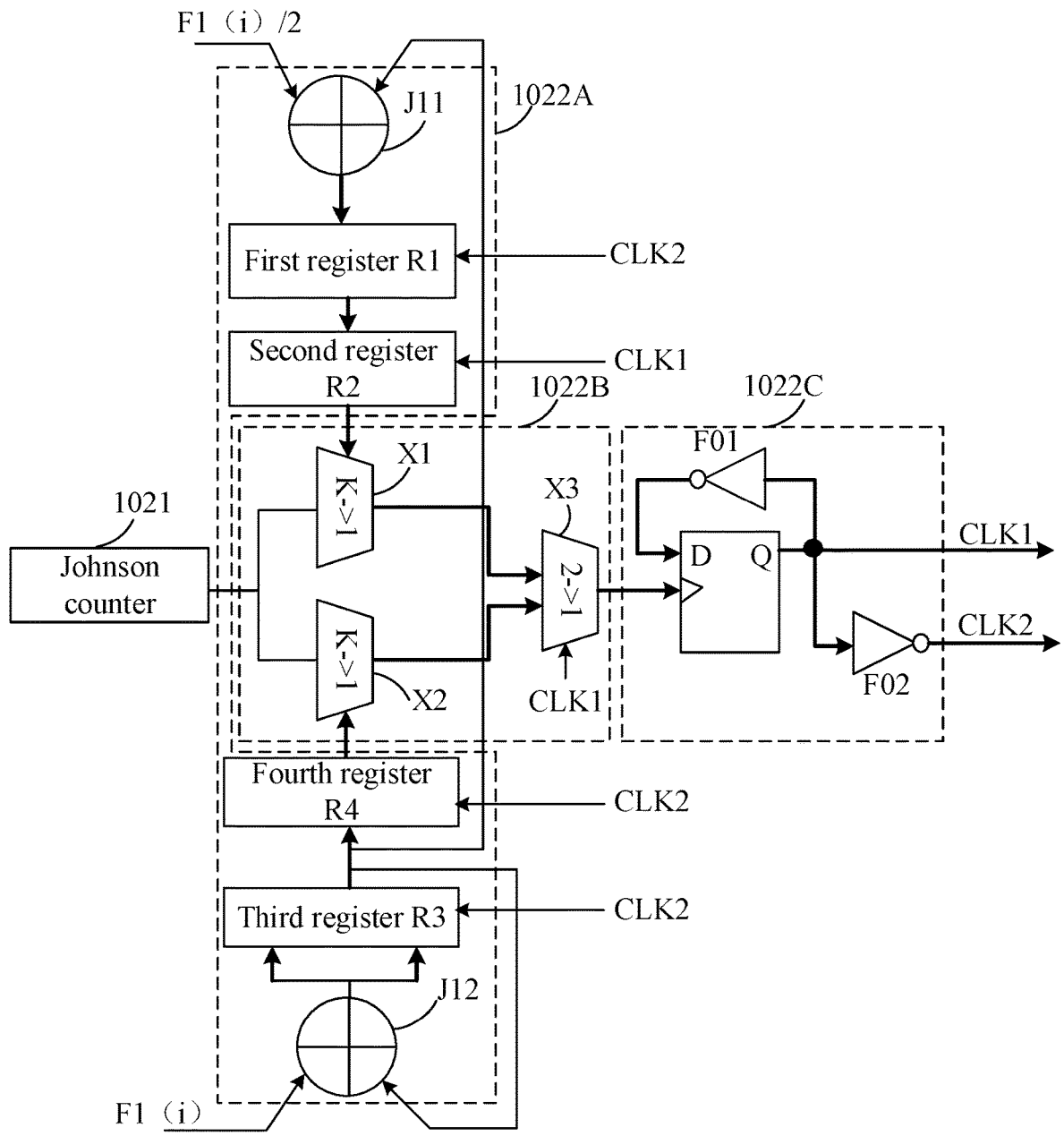
FIG. 6 is a schematic structural diagram of another first control signal generating sub-circuit according to an embodiment of the present disclosure.

FIG. 6 is a schematic structural diagram of another first control signal generating sub-circuit according to an embodiment of the present disclosure. As shown in FIG. 6, the input unit 1022A may include: a first register R1, a second register R2, a third register R3, a fourth register R4, a first adder J11, and a second adder J12. The selection unit 1022B may include: a first selector X1, a second selector X2, and a third selector X3. The output unit 1022C may include: a D flip-flop, a first inverter F01, and a second inverter F02.

The first adder J11 and the second adder J12 may be connected to the first control sub-circuit 101 (not shown in FIG. 6) and the third register R3 respectively; the first adder J11, the first register R1, the second register R2, and the first selector X1 are connected in sequence; the second adder J12, the third register R3, the fourth register R4, and the second selector X2 connected in sequence. In addition, the second register R2 may further be connected to a first clock signal terminal CLK1; the first register R1, the third register R3, and the fourth register R4 may further be connected to a second clock signal terminal CLK2.

The first selector X1 and the second selector X2 may further be connected to the candidate signals generating module 1021 and the third selector X3 respectively, and the third selector X3 may further be connected to a first input terminal of the D flip-flop and the first clock signal terminal CLK1.

A second input terminal of the D flip-flop may be connected to an output terminal of the first inverter F01, an input terminal of the first inverter F01 and an input terminal of the first inverter F02 may be connected to an output terminal of the D flip-flop. It should be noted that, referring to FIG. 6, the output terminal of the D flip-flop may be used as an output of the first clock signal terminal CLK1, an output terminal of the second inverter F02 may be used as an output of the second clock signal terminal CLK2, and clock signals provided by the first clock signal terminal CLK1 and the second clock signal terminal CLK2 have opposite phases and the same frequency.

For example, with reference to FIG. 4 and FIG. 6, assuming that the first candidate signals generating module 1021 generates a total of K candidate signals, the first selector X1 and the second selector X2 each may be a K→1 selector shown in FIG. 6 (i.e., selecting 1 target candidate signal from the K candidate signals). Because the third selector X3 is configured to select one signal from two signals. Therefore, with reference to FIG. 6, the third selector X3 may be a 2→1 selector (i.e., selecting 1 target candidate signal from 2 candidate signals). With reference to FIG. 6, a principle of generating the first control signal set by the first control signal generating sub-circuit 102 is described as follows:

For example, the first adder J11 may add up a part of the i-th first control word F1(i) (F1(i)/2 as shown in FIG. 6) and most significant bits (such as 5 bits) stored by the third register R3, and store a summation result into the first register R1 during a rising edge of the second clock signal provided by the second clock signal terminal CLK2. Alternatively, the first adder J11 may add up a part of the first control word F1(i) and all information stored in the third register R3, and then store a summation result into the first register R1 during the rising edge of the second clock signal. At the rising edge of the next first clock signal, the most significant bits stored in the first register R1 will be stored into the second register R2, and used as a selection signal of the first selector X1. Accordingly, in response to the selection signal, the first selector X1 can select a target candidate signal from the K candidate signals as an output signal of the first selector X1, and output the target candidate signal to the third selector X3.

Similarly, the second adder J12 may add up the i-th first control word F1(i) and most significant bits stored in the third register R3, and stores a summation result into the third register R3 during a rising edge of a second clock signal CLK2. Alternatively, the second adder J12 may add up the first control word F1(i) and all information stored in the third register R3, and then stores a summation result into the third register R3 during the rising edge of the second clock signal. At the rising edge of the next second clock signal, the information stored in the third register R3 will be stored into the fourth register R4, and used as a selection signal of the second selector X2. Accordingly, in response to the selection signal, the second selector X2 can select a target candidate signal from the K candidate signals as an output signal of the second selector X2, and output the target candidate signal to the third selector X3.

Further, during the rising edge of the first clock signal, the third selector X3 may select one of the output signal from the first selector X1 and the output signal from the first selector X2 as an output signal of the third selector X3, and output the output signal to the D flip-flop, to be used as an input clock signal of the D flip-flop. Then, the clock signal output by one of the output terminal of the D flip-flop and the output terminal of the second inverter F02 can be used as a final output signal. So far, the control signal has been generated. A set consisting of different control signals based on different first control words is the first control signal set.

Optionally, the selection signal output by the fourth register R4 may be used as a falling-edge selection signal, the selection signal output by the second register R2 may be used as a rising-edge selection signal, and the signal fed back by the third register R3 to the second adder J12 may be used for controlling period switching of the generated clock. Accordingly, the selection signal output by the fourth register R4 may be referred to as a falling-edge control word, and the selection signal output by the second register R2 may be referred to as a rising-edge control word.

It should be noted that the first control signal generating sub-circuit 102 may be referred to as a Time-Average Frequency Direct Period Synthesis (TAF-DPS) circuit. In addition, the control words outputted to the two adders J11 and J12 can be flexibly set by the user based on the frequencies of the required control signals; alternatively, the control words can be flexibly set by the TAF-DPS circuit based on the frequency of the final control signal to be generated. The frequency of the control signal can be entered into the TAF-DPS circuit by the user.

Figure 7:
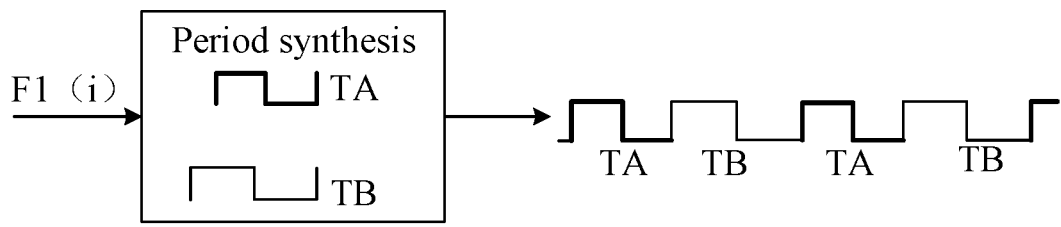
FIG. 7 is a schematic diagram of an operating principle of a first control signal generating sub-circuit according to an embodiment of the present disclosure.

The operating principle of this TAF-DPS circuit can be implemented based on the time average frequency (TAF). An optional implementation of obtaining the first control signal set based on the TAF approach, i.e., the derivation of formula (2) above, is illustrated schematically with reference to FIG. 7:

It is assumed that the i-th first control word is F1(i), a phase difference of candidate signals output by any two adjacent output terminals is A, F1(i)=I+r1, wherein I represents an integer part, and r1 represents a decimal part. Two time periods $T_A$ and $T_B$ can be outputted based on the TAF method:

$$T_A = I*\Delta \qquad \text{formula (3);}$$

$$T_B = (I+1)*\Delta \qquad \text{formula (4);}$$

The two time periods can be synthesized by the "period synthesis" technique to obtain a clock signal with a target period, and the target period $T_{TAF}$ can satisfy the following formula:

$$T_{TAF} = (1-r1)*T_A + r1*T_B \qquad \text{formula (5);}$$

By substituting formulas (3) and (4) into formula (5), it can be obtained that:

$$T_{TAF} = (I+r1)*\Delta \qquad \text{formula (6);}$$

As can be learned from formula (6), r1 can control an occurrence probability of $T_B$, i.e., the decimal part r1 of the i-th first control word F1(i) can control the frequency of switching between the periods $T_A$ and $T_B$.

Based on formula (6), the frequency $f_{TAF}$ of the clock signal output by the TAF-DPS circuit can be further calculated, i.e., the frequency of f1(i) of the i-th first control signal can satisfy the following formula:

$$f1(i) = f_{TAF} = 1/T_{TAF} = 1/[(I+r1)*\Delta] = 1/F1(i)*\Delta \qquad \text{formula (7);}$$

By substituting A calculated in formula (1) into formula (7), it can be obtained that:

$$f1(i) = f_{TAF} = (K*f1')/F1(i), \text{ i.e., formula (2) above.}$$

The plurality of first control signals generated by the TAF-DPS circuit in the embodiments of the present disclosure based on the specific TAF operation manner are uncertain to some degree, and the first key is generated based on the first control signals. Therefore, the security of the generated first key is ensured, making it difficult to crack the key.

In addition, if the optical communication device detecting the optical signals intends to establish a communication connection, it also needs the TAF-DPS circuit to generate a key. In other words, the establishment of the communication connection as described in the embodiments of the present disclosure requires not only support of a software program, but also support of a hardware circuit. Only when the hardware is matched can the keys be reliably extracted and matched, and then paired successfully, so as to establish the communication connection reliably.

Optionally, the first driving circuit 10 may further be configured to generate a first target identifier which uniquely identifies the optical communication device, and send an initial driving signal to the optical signal transmitting circuit 20 based on the first target identifier. Accordingly, the optical signal transmitting circuit 20 may further be configured to transmit a third optical signal in response to the initial driving signal.

For example, the optical signal transmitting circuit 20 may transmit the third optical signal with a third frequency in response to the initial driving signal. In addition, the third frequency may also be a default frequency stored in the optical communication device, and the third frequency may be a frequency agreed upon by the optical communication device and the optical communication device detecting the optical signals. Further, the third frequency may be the same as or different from the first frequency described in the foregoing embodiment.

The third optical signal may be used for instructing the optical communication device detecting the optical signal to obtain the first target identifier, and perform the operation of obtaining the first target plaintext and generating a second key if an identifier the same as the first target identifier is found in a plurality of stored identifiers. That is, before the first optical signal and the second optical signal are transmitted, the first driving circuit 10 may first control the optical signal transmitting circuit 20 to transmit the third optical signal, to instruct the optical communication device detecting the optical signal to obtain, based on the third optical signal, the first target identifier of the optical communication device transmitting the third optical signal, thereby identifying the identity of the optical communication device transmitting the optical signal.

After finding the first target identifier stored therein, the optical communication device detecting the optical signal then obtains the first target plaintext and the first key, which reduces the power consumption of the optical communication device detecting the optical signal while ensuring the reliability of establishment of the communication connection.

It should be noted that, on the one hand, since devices capable of emitting optical signals (e.g., flashing lights in mobile terminals) are installed in various types of electronic devices nowadays, optical communication devices can be more easily integrated into various types of electronic devices without introducing excessive hardware resources or making separate products. On the other hand, since devices capable of emitting optical signals (e.g., illumination lamps) are ubiquitous at present, if the circuits in the optical communication device provided by the embodiments of the present disclosure are configured in existing devices capable of emitting optical signals, the density of optical communication devices can be improved, laying a solid foundation for the construction of smart cities. Furthermore, if visible light is used for communication, it can also bring convenience to users and improve sense of well-being of the users.

In conclusion, the embodiments of the present disclosure provide an optical communication device. In the optical communication device, the first driving circuit can control, based on the generated first target plaintext, the optical signal transmitting circuit to transmit the first optical signal, and control, based on the generated first key, the optical signal transmitting circuit to transmit the second optical signal. That is, an optical communication device that detects the optical signals can establish, based on the optical signals, a communication connection with the optical communication device that transmits the optical signals. Because optical signals have a relatively long transmitting distance and a relatively large range, the flexibility of establishment of the communication connection is improved while the reliability of the established communication connection is ensured.

Figure 8:
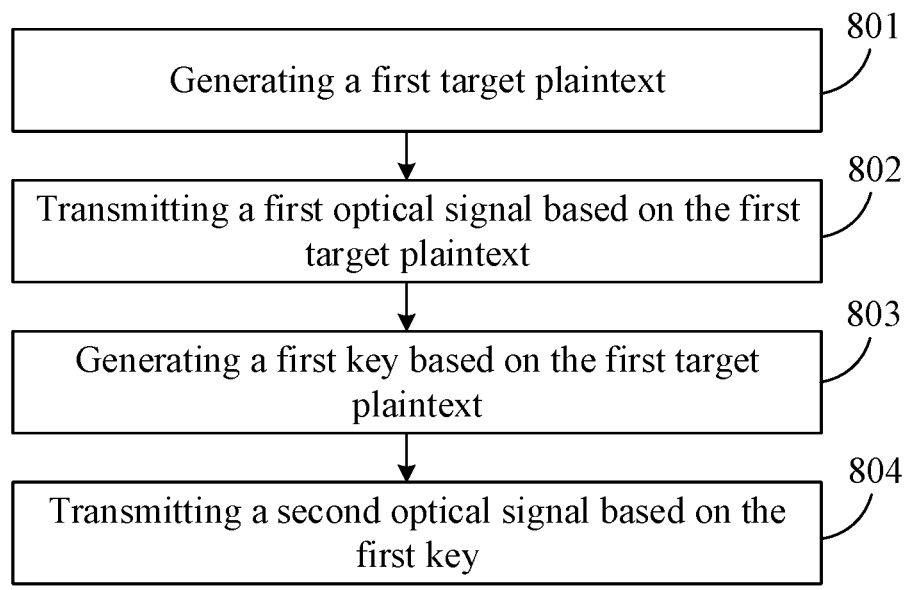
FIG. 8 is a flowchart of a method for establishing a communication connection according to an embodiment of the present disclosure.

FIG. 8 is a flowchart of a method for establishing a communication connection according to an embodiment of the present disclosure. The method is applicable to the optical communication device in any one of FIG. 1 to FIG. 3. As shown in FIG. 8, the method may include the following steps:

In 801, a first target plaintext is generated.

In 802, a first optical signal is transmitted based on the first target plaintext.

In 803, a first key is generated based on the first target plaintext.

In 804, a second optical signal is transmitted based on the first key.

In conclusion, the embodiments of the present disclosure provide a method for establishing a communication connection. In the method, the first optical signal can be transmitted based on the generated first target plaintext; and the second optical signal can be transmitted based on the generated first key. Accordingly, an optical communication device that detects the optical signals can establish, based on the optical signals, a communication connection with the optical communication device that transmits the optical signals. Because optical signals have a relatively long transmitting distance and a relatively large range, the flexibility of establishment of the communication connection is improved while the reliability of the established communication connection is ensured.

It should be noted that, for optional implementations corresponding to 801 to 804, reference may be made to the description about the apparatus in FIG. 1 to FIG. 3 above, and details are not described again in the method embodiment.

Figure 9:
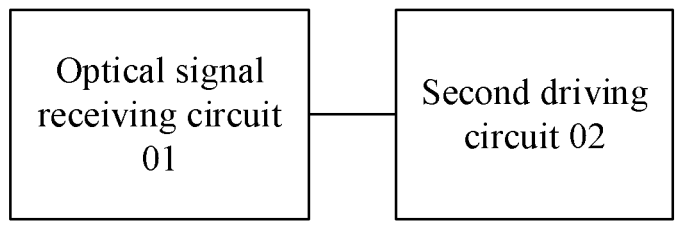
FIG. 9 is a schematic structural diagram of still another optical communication device according to an embodiment of the present disclosure.

FIG. 9 is a schematic structural diagram of an optical communication device according to an embodiment of the present disclosure. As shown in FIG. 9, the optical communication device may include: an optical signal receiving circuit 01, and a second driving circuit 02 connected to the optical signal receiving circuit 01.

The optical signal receiving circuit 01 may be configured to receive a fourth optical signal and a fifth optical signal, convert the fourth optical signal into a first electrical signal, convert the fifth optical signal into a second electrical signal, and send the first electrical signal and the second electrical signal to the second driving circuit 02. Optionally, the optical signal receiving circuit 01 may be a photo diode capable of converting an optical signal into an electrical signal.

The second driving circuit 02 may be configured to obtain a second target plaintext based on the first electrical signal, obtain a second key based on the second electrical signal, generate a third key based on the second target plaintext, and verify whether the third key matches the second key. For the verification of whether the second key matches the third key, reference may be made to the key matching rule in the foregoing embodiment, and details are not described again herein.

Optionally, when verifying whether the third key matches the second key, the optical communication device may establish a communication connection reliably with the optical communication device that transmits the fourth optical signal and the fifth optical signal.

In conclusion, the embodiments of the present disclosure provide an optical communication device. In the optical communication device, the optical signal receiving circuit can convert the detected optical signals into electrical signals and transmit the electrical signals to the second driving circuit; the second driving circuit can obtain the key and the target plaintext generated by the optical communication device that transmits the optical signals, and establish, based on the key and the target plaintext, a reliable communication connection with the optical communication device that transmits the optical signals. Because optical signals have a relatively long transmitting distance and a relatively large range, the flexibility of establishment of the communication connection is improved while the reliability of the established communication connection is ensured.

Figure 10:
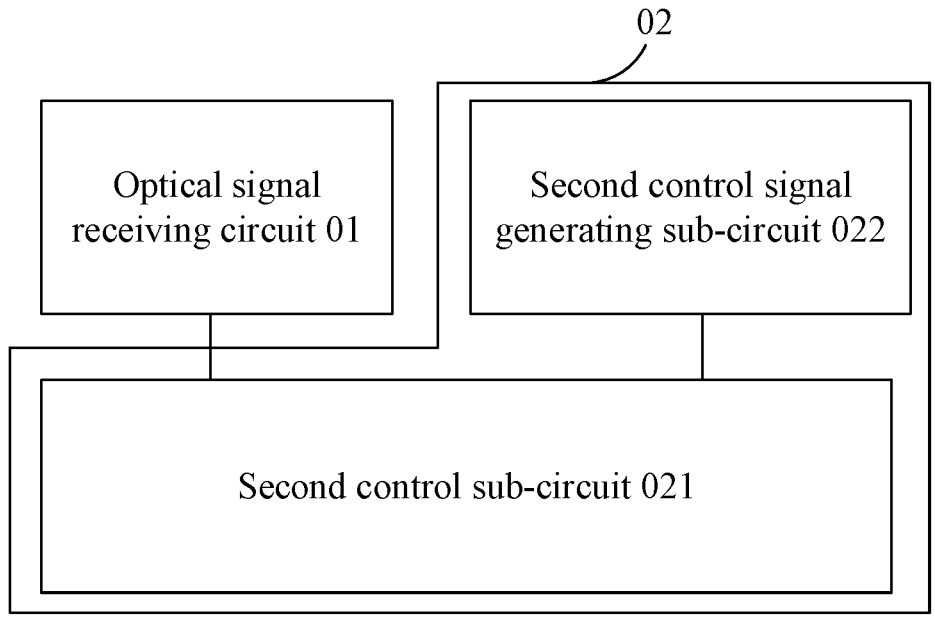
FIG. 10 is a schematic structural diagram of still another optical communication device according to an embodiment of the present disclosure.

FIG. 10 is a schematic structural diagram of another optical communication device according to an embodiment of the present disclosure. As shown in FIG. 10, the second driving circuit 02 may include: a second control sub-circuit 021 and a second control signal generating sub-circuit 022.

The second control sub-circuit 021 may be connected to the optical signal receiving circuit 01 and the second control signal generating sub-circuit 022. The second control sub-circuit 021 may be configured to obtain a second target plaintext based on a first electrical signal, obtain a second key based on a second electrical signal, generate a second control word set based on the second target plaintext, and send the second control word set to the second control signal generating sub-circuit 022. The second control word set may include a plurality of different second control words.

Optionally, the second control sub-circuit 021 may alternatively be an MCU, and the second target plaintext may include: a second random seed. Similarly, the second control sub-circuit 021 may have the same structure and functions as the first control sub-circuit 101. For the operating principle of the second control sub-circuit 021, reference may be made to the foregoing description about the first control sub-circuit 101, and details are not described herein again. Moreover, compared with the first control sub-circuit 101, the second control sub-circuit 021 may have a function of converting an electrical signal into a digital signal.

The second control signal generating sub-circuit 022 may be configured to generate a second control signal set based on the second control word set, and send the second control signal set to the second control sub-circuit 021. The second control signal set may include a plurality of second control signals having different frequencies.

Optionally, for the method of generating the second control signal set by the second control signal generating sub-circuit 022, reference may be made to the foregoing method of generating the second control signal set by the first control signal generating sub-circuit 102, and details are not described herein again. Accordingly, the second control signal generating sub-circuit 022 may also have the same modules as the first control signal generating sub-circuit 102, that is, the second control signal generating sub-circuit 022 may include: the modules in the first control signal generating sub-circuit 102 as shown in FIG. 5 or FIG. 6.

The second control sub-circuit 021 may be further configured to generate a third key based on the second control signal set, and verify whether the third key matches the second key.

Optionally, for the method of generating the third key by the second control sub-circuit 021, reference may be made to the foregoing method of generating the first key by the first control sub-circuit 101, and details are not described herein again. Compared with the first control sub-circuit 101, the second control sub-circuit 021 may have a function of determining whether a received key matches a generated key.

Optionally, in the embodiments of the present disclosure, the optical signal receiving circuit 01 may further be configured to receive a sixth optical signal, convert the sixth optical signal into a third electrical signal, and send the third electrical signal to the second driving circuit 02. Moreover, the second driving circuit 02 may further be configured to obtain a second target identifier based on the third electrical signal, search for a stored identifier which is the same as the second target identifier, and if the stored identifier which is the same as the second target identifier is found, perform an operation of obtaining the second target plaintext and the second key.

That is, the second driving circuit 02 may first obtain a second target identifier based on the received sixth optical signal, and search a storage space thereof (such as a local user book) to determine whether the second target identifier is stored. If yes, the identification succeeds. In this case, the second driving circuit 02 may further receive a fourth optical signal and a fifth optical signal, obtain the second target plaintext based on the fourth optical signal, obtain the second key based on the fifth optical signal, generate the third key based on the second target plaintext, and compare the third key and the obtained second key to establish a communication connection with the optical communication device that transmits the sixth optical signal.

In conclusion, the embodiments of the present disclosure provide an optical communication device. In the optical communication device, the optical signal receiving circuit can convert the detected optical signals into electrical signals and transmit the electrical signals to the second driving circuit; the second driving circuit can obtain the key and the target plaintext generated by the optical communication device that transmits the optical signals, and establish, based on the key and the target plaintext, a reliable communication connection with the optical communication device that transmits the optical signals. Because optical signals have a relatively long transmitting distance and a relatively large range, the flexibility of establishment of the communication connection is improved while the reliability of the established communication connection is ensured.

Figure 11:
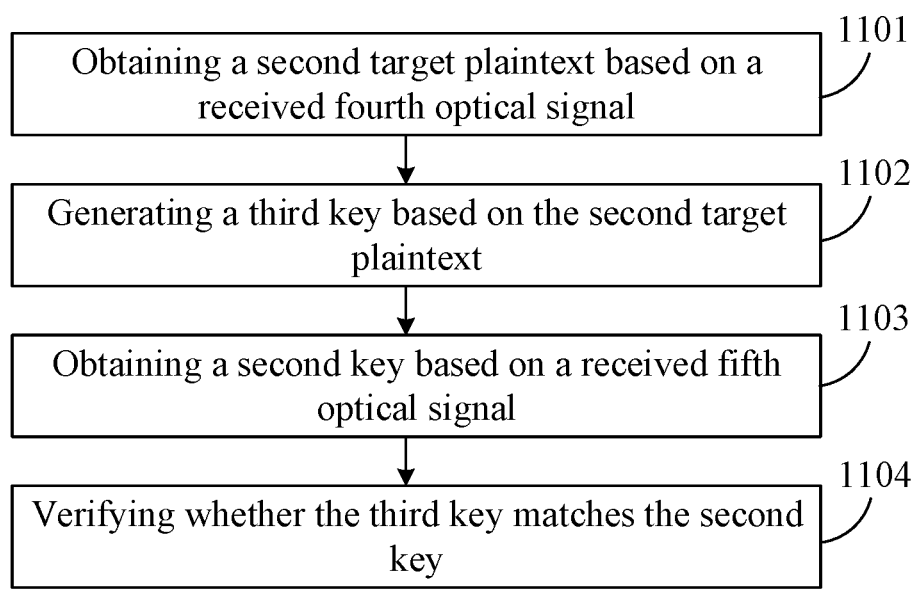
FIG. 11 is a flowchart of another method for establishing a communication connection according to an embodiment of the present disclosure.

FIG. 11 is a flowchart of a method for establishing a communication connection according to an embodiment of the present disclosure. The method is applicable to the optical communication device in FIG. 9 or FIG. 10. As shown in FIG. 11, the method may include the following steps:

In 1101, a second target plaintext is obtained based on a received fourth optical signal.

In 1102, a third key is generated based on the second target plaintext.

In 1103, a second key is obtained based on a received fifth optical signal.

In 1104, it is verified whether the third key matches the second key.

In conclusion, the embodiments of the present disclosure provide a method for establishing a communication connection. The optical communication device in the method can obtain the second target plaintext and the second key based on the received optical signals, generate the third key based on the second target plaintext, and verify whether the third key matches the second key. Accordingly, based on a matching result, the optical communication device can establish a reliable communication connection with an optical communication device that transmits the optical signals. Because optical signals have a relatively long transmitting distance and a relatively large range, the flexibility of establishment of the communication connection is improved while the reliability of the established communication connection is ensured.

It should be noted that, for optional implementations corresponding to 1101 to 1104, reference may be made to the description about the apparatus in FIG. 9 or FIG. 10 above, and details are not described again in the method embodiment.

Figure 12:
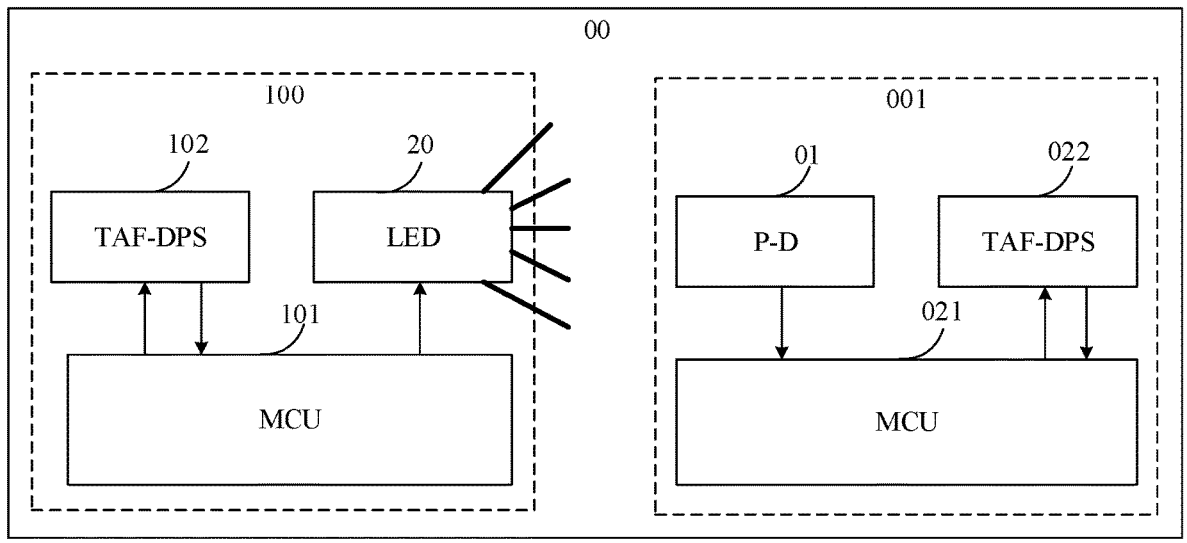
FIG. 12 is a schematic structural diagram of an optical communication system according to an embodiment of the present disclosure.

Optionally, FIG. 12 is a schematic structural diagram of an optical communication system according to an embodiment of the present disclosure. As shown in FIG. 12, the optical communication system 00 may include: an optical signal transmitting terminal 100 and an optical signal receiving terminal 001. The optical signal transmitting terminal 100 may include: the optical communication device as shown in any one of FIG. 1 to FIG. 3, and the optical signal receiving terminal 001 may include: the optical communication device as shown in FIG. 9 or FIG. 10.

Accordingly, a fourth optical signal received by the optical signal receiving terminal 001 and a first optical signal transmitted by the optical signal transmitting terminal 100 may be the same optical signal. A second target plaintext obtained by the optical signal receiving terminal 001 may be the same as a first target plaintext generated by the optical signal transmitting terminal 100. A fifth optical signal received by the optical signal receiving terminal 001 and a second optical signal transmitted by the optical signal transmitting terminal 100 may be the same optical signal; a second key obtained by the optical signal receiving terminal 001 may be the same as a first key generated by the optical signal transmitting terminal 100.

That is, the optical signal receiving terminal 001 may be configured to establish a communication connection with the optical signal transmitting terminal 100 upon verifying that the generated third key is the same as the obtained second key.

In addition, a sixth optical signal received by the optical signal receiving terminal 001 and a third optical signal transmitted by the optical signal transmitting terminal 100 may be the same optical signal. Accordingly, a second target identifier obtained by the optical signal receiving terminal 001 may be the same as a first target identifier generated by the optical signal transmitting terminal 100. That is, upon finding a stored identifier the same as the first target identifier, the optical communication device as shown in FIG. 9 or FIG. 10 may further obtain the first target plaintext and the first key generated by the optical communication device as shown in any one of FIG. 1 to FIG. 3.

It should be noted that, the optical signal receiving terminal 001 may further include: the optical communication device as shown in any one of FIG. 1 to FIG. 3. That is, the optical signal receiving terminal 001 may further have an optical signal transmitting function, to request establishing communication connections with other optical communication devices. And/or, the optical signal transmitting terminal 100 may further include: the optical communication device as shown in FIG. 9 or FIG. 10. The optical signal transmitting terminal 100 may further have an optical signal receiving function, to actively establish communication connections with other optical communication devices.

If the optical signal receiving terminal 001 further has the optical signal transmitting function, similar to the process that the optical signal transmitting terminal 100 establishes a communication connection with the optical signal receiving terminal 001 by transmitting optical signals, the optical signal receiving terminal 001 may actively generate a target plaintext, generate a key based on the generated target plaintext, transmit an optical signal based on the generated target plaintext, and transmit another optical signal based on the generated key. In this way, another optical communication device that detects the optical signals (for example, the optical signal transmitting terminal 100 that further has the optical signal receiving function) may be instructed to obtain, based on the optical signals, the target plaintext and the key that are actively generated by the optical signal receiving terminal 001, generate another key based on the obtained target plaintext, and reliably establish a communication connection with the optical signal receiving terminal 001 upon verifying that the generated key matches the obtained key. In addition, the optical signal receiving terminal 001 may further actively generate a target identifier that uniquely indicates its identity, and transmit further another optical signal based on the generated target identifier. In this way, another optical communication device that detects the further another optical signal is instructed to obtain, based on the further another optical signal, the target identifier generated by the optical signal receiving terminal 001, and if a stored identifier the same as the target identifier is found, perform the operation of obtaining the target plaintext and the key actively generated by the optical signal receiving terminal 001.

If the optical signal transmitting terminal 100 further has the optical signal receiving function, similar to the process that the optical signal receiving terminal 001 establishes a communication connection with the optical signal transmitting terminal 100 by receiving optical signals, the optical signal transmitting terminal 100 may actively receive optical signals transmitted by another optical communication device capable of transmitting optical signals (for example, the optical signal receiving terminal 001 that further has the optical signal transmitting function), convert the received optical signals into electrical signals, obtain, based on the electrical signals obtained through conversion, a target plaintext and a key generated by the optical communication device that transmit the optical signals, generate another key based on the obtained target plaintext, and upon verifying that the generated key matches the obtained key, reliably establish a communication connection with the optical communication device that transmits the optical signals. In addition, the optical signal transmitting terminal 100 may further obtain, based on the received optical signal, a target identifier generated by the optical communication device that transmits the optical signal, and upon finding a stored identifier which is the same as the target identifier, further perform the operation of obtaining the target plaintext and the key generated by the optical communication device that transmits the optical signal.

For example, FIG. 12 shows an optical communication system in which the optical signal transmitting terminal 100 only has the optical signal transmitting function, and the optical signal receiving terminal 001 only has the optical signal receiving function. In addition, in the shown optical signal transmitting terminal 100, the first control sub-circuit 101 is an MCU, the first control signal generating sub-circuit 102 is a TAF-DPS circuit, and the optical signal transmitting circuit 20 is an LED. In the shown optical signal receiving terminal 001, the second control sub-circuit 021 is an MCU, the second control signal generating sub-circuit 022 is a TAF-DPS circuit, and the optical signal receiving circuit 01 is a photo diode P-D.

During normal operation, with reference to FIG. 12, the optical signal transmitting circuit 20 in the optical signal transmitting terminal 100 may transmit optical signals having different frequencies, to instruct the optical signal receiving terminal 001 that detects the optical signals to perform a series operations such as key extraction, information matching, and identification based on the received optical signals, so as to establish a reliable communication connection with the optical signal transmitting terminal 100. The optical signal transmitting terminal 100 may be referred to as a light key, and the optical signal receiving terminal 001 may be referred to as a light lock.

Figure 13:
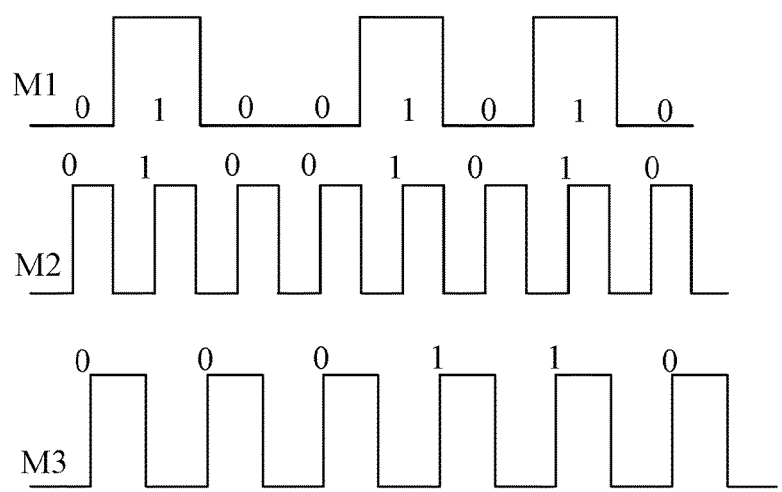
FIG. 13 is a schematic diagram of a generated plaintext and ciphertext according to an embodiment of the present disclosure.

FIG. 13 is a schematic diagram of a generated plaintext and ciphertext. As shown in FIG. 13, assuming that the first target plaintext indicated by the first optical signal transmitted by the optical signal transmitting terminal 100 is a pulse M1 denoted by binary values "01001010", after receiving the first optical signal, the optical signal receiving terminal 001 may register the pulse M1 by using different clock signals to obtain the first target plaintext, and further generate a second key based on the first target plaintext. For example, the pulse M2 shown in FIG. 13 is a pulse for indicating the obtained first target plaintext, and the pulse M3 is a pulse for indicating the generated second key, denoted by binary values "000110". Further, the optical signal receiving terminal 001 may compare whether the generated second key matches the obtained first key, and if yes, establish a communication connection with the optical signal transmitting terminal 100; otherwise, refuse to establish a communication connection with the optical signal transmitting terminal 100.

Figure 14:
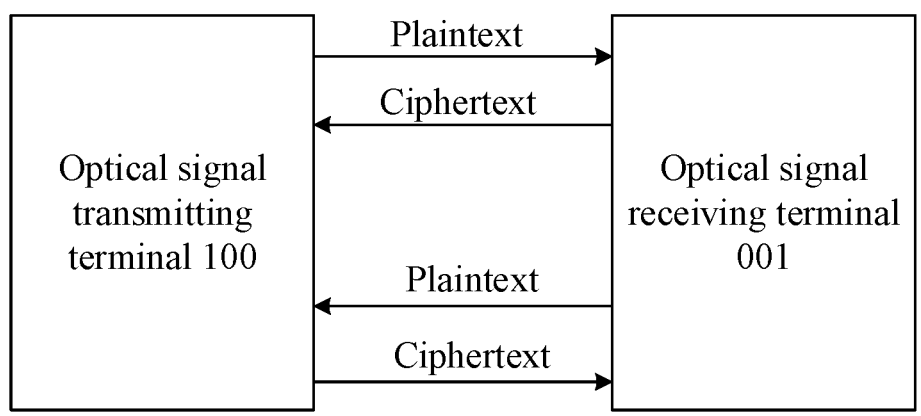
FIG. 14 is a schematic structural diagram of another optical communication system according to an embodiment of the present disclosure.

In another example, FIG. 14 shows another optical communication system in which the optical signal transmitting terminal 100 has not only the optical signal transmitting function but also the optical signal receiving function, and the optical signal receiving terminal 001 has not only the optical signal receiving function but also the optical signal transmitting function. Referring to FIG. 14, the shown optical signal transmitting terminal 100 not only can send a plaintext and a ciphertext to the optical signal receiving terminal 001, but also can receive a plaintext and ciphertext sent by the optical signal receiving terminal 001. Similarly, the optical signal receiving terminal 001 not only can receive a plaintext and ciphertext sent by the optical signal transmitting terminal 100, but also can send a plaintext and ciphertext to the optical signal transmitting terminal 100.

With reference to the optical communication system shown in FIG. 14, by taking an example in which the optical signal receiving terminal 001 actively establishes a communication connection with the optical signal transmitting terminal 100, a process of establishing a communication connection between the two is schematically described.

The optical signal receiving terminal 001 may first generate a second target identifier that uniquely indicates its identity, and transmit a seventh optical signal based on the second target identifier. Then, the optical signal receiving terminal 001 generates a third target plaintext, generates a fourth key based on the third target plaintext, transmits an eighth optical signal based on the third target plaintext, and transmits a ninth optical signal based on the fourth key. After receiving the seventh optical signal, the eighth optical signal, and the ninth optical signal, the optical signal transmitting terminal 100 can first obtain the second target identifier based on the seventh optical signal, and after finding a stored identifier which is the same as the second target identifier, further obtain the third target plaintext based on the eighth optical signal, obtain the fourth key based on the ninth optical signal, generate a fifth key based on the third target plaintext, and upon verifying that the fifth key matches the fourth key, reliably establish a communication connection with the optical signal receiving terminal 001.

It should be understood that the term "and/or" in this specification indicates three types of relationships. For example, A and/or B may indicate that A exists alone, A and B coexist, or B exists alone. The character "/" generally indicates that the associated objects are in an "or" relationship.

A person skilled in the art can clearly understand that, for convenience and brevity of description, reference can be made to corresponding processes in the foregoing method embodiments for specific operating processes of various circuits, sub-circuits, modules, and components in the optical communication device described above. Details are not described herein again.

The foregoing descriptions are merely optional embodiments of the present disclosure and are not intended to limit the present disclosure. Any modification, equivalent replacement, and improvement made within the spirit and principle of the present disclosure shall be included within the protection scope of the present disclosure.

What is claimed is:

1. An optical communication device, comprising: a first driving circuit, and an optical signal transmitting circuit connected to the first driving circuit, wherein
    the first driving circuit is configured to: generate a first target plaintext, and output a first driving signal to the optical signal transmitting circuit based on the first target plaintext;
    and, generate a first key based on the first target plaintext, and output a second driving signal to the optical signal transmitting circuit based on the first key; and
    the optical signal transmitting circuit is configured to transmit a first optical signal in response to the first driving signal, and transmit a second optical signal in response to the second driving signal;
    wherein the first driving circuit comprises: a first control sub-circuit and a first control signal generating sub-circuit;
    the first control sub-circuit is respectively connected to the optical signal transmitting circuit and the first control signal generating sub-circuit, the first control sub-circuit is configured to generate the first target plaintext, generate a first control word set based on the first target plaintext, and send the first control word set to the first control signal generating sub-circuit, the first control word set comprising a plurality of different first control words;
    the first control signal generating sub-circuit is configured to generate a first control signal set based on the first control word set, and send the first control signal set to the first control sub-circuit, the first control signal set comprising a plurality of different first control signals having different frequencies; and
    the first control sub-circuit is further configured to generate the first key based on the first control signal set, output the second driving signal to the optical signal transmitting circuit based on the first key, and output the first driving signal to the optical signal transmitting circuit based on the first target plaintext.

2. The optical communication device according to claim 1, wherein the first target plaintext comprises: a first random seed.

3. The optical communication device according to claim 1, wherein the first control signal generating sub-circuit comprises: a candidate signals generating module and a control signal generating module;
    the candidate signals generating module is connected to the control signal generating module, and the candidate signals generating module has a plurality of output terminals; the candidate signals generating module is configured to generate a plurality of candidate signals having the same frequency and different phases, and output the plurality of candidate signals to the control signal generating module through the plurality of output terminals in a one-to-one correspondence, wherein a quantity of the candidate signals is the same as a quantity of the output terminals, and the candidate signals output by any two adjacent output terminals have the same phase difference; and
    the control signal generating module is further connected to the first control sub-circuit; the control signal generating module is configured to generate the first control signal set based on the plurality of candidate signals and the first control word set sent by the first control sub-circuit, and send the first control signal set to the first control sub-circuit.

4. The optical communication device according to claim 1, wherein the first driving circuit is further configured to generate a first target identifier which uniquely identifies the optical communication device, and send an initial driving signal to the optical signal transmitting circuit based on the first target identifier; and the optical signal transmitting circuit is further configured to transmit a third optical signal in response to the initial driving signal.

5. The optical communication device according to claim 3, wherein the first target plaintext comprises: a first random seed;

the first driving circuit is further configured to generate a first target identifier which uniquely identifies the optical communication device, and send an initial driving signal to the optical signal transmitting circuit based on the first target identifier; and the optical signal transmitting circuit is further configured to transmit a third optical signal in response to the initial driving signal.

6. An optical communication device, comprising: an optical signal receiving circuit, and a second driving circuit connected to the optical signal receiving circuit; wherein the optical signal receiving circuit is configured to receive a fourth optical signal and a fifth optical signal, convert the fourth optical signal into a first electrical signal, convert the fifth optical signal into a second electrical signal, and send the first electrical signal and the second electrical signal to the second driving circuit; and the second driving circuit is configured to obtain a second target plaintext based on the first electrical signal, obtain a second key based on the second electrical signal, generate a third key based on the second target plaintext, and verify whether the third key matches the second key;

wherein the second driving circuit comprises: a second control sub-circuit and a second control signal generating sub-circuit;

the second control sub-circuit is respectively connected to the optical signal receiving circuit and the second control signal generating sub-circuit, the second control sub-circuit is configured to obtain the second target plaintext based on the first electrical signal, obtain the second key based on the second electrical signal, generate a second control word set based on the second target plaintext, and send the second control word set to the second control signal generating sub-circuit, the second control word set comprising a plurality of different second control words;

the second control signal generating sub-circuit is configured to generate a second control signal set based on the second control word set, and send the second control signal set to the second control sub-circuit, the second control signal set comprising a plurality of second control signals having different frequencies; and the second control sub-circuit is further configured to generate the third key based on the second control signal set, and verify whether the third key matches the second key.

7. The optical communication device according to claim 6, wherein the second target plaintext comprises: a second random seed.

8. The optical communication device according to claim 6, wherein the optical signal receiving circuit is further configured to receive a sixth optical signal, convert the sixth optical signal into a third electrical signal, and send the third electrical signal to the second driving circuit; and the second driving circuit is further configured to obtain a second target identifier based on the third electrical signal, search for a stored identifier which is the same as the second target identifier, and if the stored identifier which is the same as the second target identifier is found, perform an operation of obtaining the second target plaintext and the second key.

9. A method for establishing a communication connection, applied to the optical communication device according to claim 1, the method comprising:

generating a first target plaintext;

transmitting a first optical signal based on the first target plaintext;

generating a first key based on the first target plaintext; and transmitting a second optical signal based on the first key.

10. A method for establishing a communication connection, applied to the optical communication device according to claim 6, the method comprising:

obtaining a second target plaintext based on a received fourth optical signal;

generating a third key based on the second target plaintext;

obtaining a second key based on a received fifth optical signal; and verifying whether the third key matches the second key.

11. An optical communication system, comprising: an optical signal transmitting terminal and an optical signal receiving terminal, wherein the optical signal transmitting terminal comprises a first optical communication device which is the same as the optical communication device according to claim 1, and a second optical communication device comprising an optical signal receiving circuit and a second driving circuit which is connected to the optical signal receiving circuit; wherein the optical signal receiving circuit is configured to receive a fourth optical signal and a fifth optical signal, convert the fourth optical signal into a first electrical signal, convert the fifth optical signal into a second electrical signal, and send the first electrical signal and the second electrical signal to the second driving circuit;

the second driving circuit is configured to obtain a second target plaintext based on the first electrical signal, obtain a second key based on the second electrical signal, generate a third key based on the second target plaintext, and verify whether the third key matches the second key;

the fourth optical signal received by the optical signal receiving terminal and the first optical signal transmitted by the optical signal transmitting terminal are the same optical signal; the second target plaintext obtained by the optical signal receiving terminal is the same as the first target plaintext generated by the optical signal transmitting terminal; the fifth optical signal received by the optical signal receiving terminal and the second optical signal transmitted by the optical signal transmitting terminal are the same optical signal; and the second key obtained by the optical signal receiving terminal is the same as the first key generated by the optical signal transmitting terminal; and the optical signal receiving terminal is configured to establish a communication connection with the optical signal transmitting terminal upon verifying that the generated third key is the same as the obtained second key.

12. The system according to claim 11, wherein the first driving circuit is further configured to generate a first target identifier which uniquely identifies the optical communication device, and send an initial driving signal to the optical signal transmitting circuit based on the first target identifier;
the optical signal transmitting circuit is further configured to transmit a third optical signal in response to the initial driving signal;
the optical signal receiving circuit is further configured to receive a sixth optical signal, convert the sixth optical signal into a third electrical signal, and send the third electrical signal to the second driving circuit;
the second driving circuit is further configured to obtain a second target identifier based on the third electrical signal, search for a stored identifier which is the same as the second target identifier, and if the stored identifier which is the same as the second target identifier is found, perform an operation of obtaining the second target plaintext and the second key; and
the sixth optical signal received by the optical signal receiving terminal and the third optical signal transmitted by the optical signal transmitting terminal are the same optical signal; and the second target identifier obtained by the optical signal receiving terminal is the same as the first target identifier generated by the optical signal transmitting terminal.

13. The system according to claim 11, wherein at least one of the optical signal receiving terminal and the optical signal transmitting terminal comprises both one first optical communication device and one second optical communication device.

14. The system according to claim 11, wherein the first control signal generating sub-circuit comprises: a candidate signals generating module and a control signal generating module;
the candidate signals generating module is connected to the control signal generating module, and the candidate signals generating module has a plurality of output terminals; the candidate signals generating module is configured to generate a plurality of candidate signals having the same frequency and different phases, and output the plurality of candidate signals to the control signal generating module through the plurality of output terminals in a one-to-one correspondence, wherein a quantity of the candidate signals is the same as a quantity of the output terminals, and the candidate signals output by any two adjacent output terminals have the same phase difference; and
the control signal generating module is further connected to the first control sub-circuit; the control signal generating module is configured to generate the first control signal set based on the plurality of candidate signals and the first control word set sent by the first control sub-circuit, and send the first control signal set to the first control sub-circuit.

15. The system according to claim 11, wherein the second driving circuit comprises: a second control sub-circuit and a second control signal generating sub-circuit;
the second control sub-circuit is respectively connected to the optical signal receiving circuit and the second control signal generating sub-circuit, the second control sub-circuit is configured to obtain the second target plaintext based on the first electrical signal, obtain the second key based on the second electrical signal, generate a second control word set based on the second target plaintext, and send the second control word set to the second control signal generating sub-circuit, the second control word set comprising a plurality of different second control words;
the second control signal generating sub-circuit is configured to generate a second control signal set based on the second control word set, and send the second control signal set to the second control sub-circuit, the second control signal set comprising a plurality of second control signals having different frequencies; and
the second control sub-circuit is further configured to generate the third key based on the second control signal set, and verify whether the third key matches the second key.

16. The system according to claim 15, wherein the first target plaintext comprises a first random seed, and the second target plaintext comprises a second random seed.

17. The system according to claim 11, wherein the second driving circuit comprises: a second control sub-circuit and a second control signal generating sub-circuit;
the second control sub-circuit is respectively connected to the optical signal receiving circuit and the second control signal generating sub-circuit, the second control sub-circuit is configured to obtain the second target plaintext based on the first electrical signal, obtain the second key based on the second electrical signal, generate a second control word set based on the second target plaintext, and send the second control word set to the second control signal generating sub-circuit, the second control word set comprising a plurality of different second control words;
the second control signal generating sub-circuit is configured to generate a second control signal set based on the second control word set, and send the second control signal set to the second control sub-circuit, the second control signal set comprising a plurality of second control signals having different frequencies; and
the second control sub-circuit is further configured to generate the third key based on the second control signal set, and verify whether the third key matches the second key.

* * * * *